D. H. DONACHY.
RESILIENT TIRE FOR VEHICLE WHEELS.
APPLICATION FILED DEC. 14, 1912.
1,083,670. Patented Jan. 6, 1914.
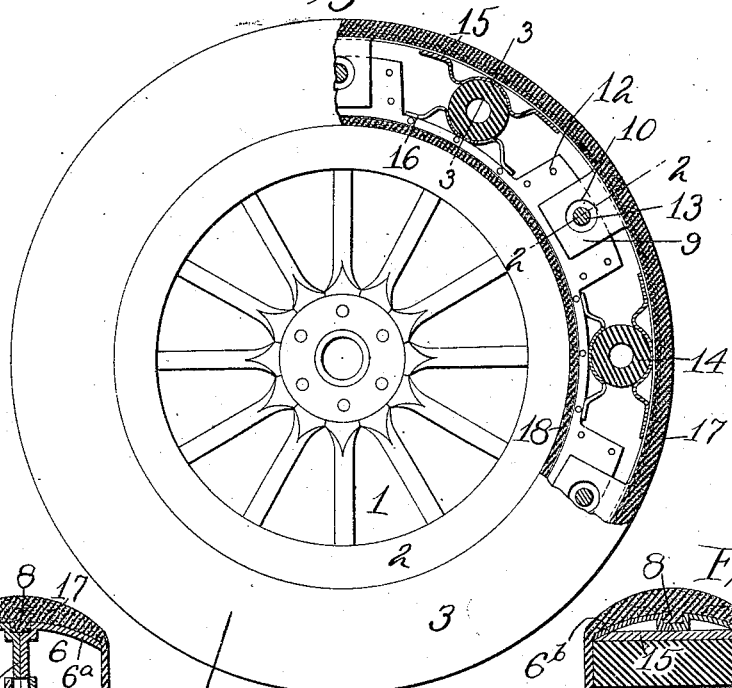
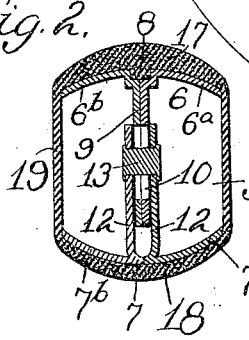
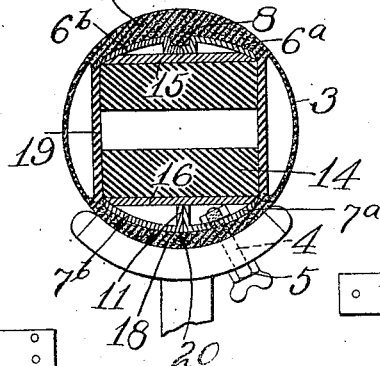
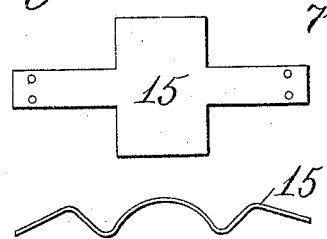
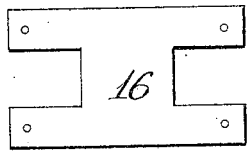
Attest:
Benton M. Stahl
C. E. Parsons
Inventor.
Darwin H. Donachy.
By Middleton Donaldson
Attys

UNITED STATES PATENT OFFICE.

DARWIN H. DONACHY, OF WILLIAMSPORT, PENNSYLVANIA, ASSIGNOR OF FORTY-NINE ONE-HUNDREDTHS TO D. TUTTLE MAHAFFEY, OF WILLIAMSPORT, PENNSYLVANIA.

RESILIENT TIRE FOR VEHICLE-WHEELS.

1,083,670. Specification of Letters Patent. Patented Jan. 6, 1914.

Application filed December 14, 1912. Serial No. 736,870.

*To all whom it may concern:*

Be it known that I, DARWIN H. DONACHY, a citizen of the United States, residing at Williamsport, Pennsylvania, have invented certain new and useful Improvements in Resilient Tires for Vehicle-Wheels, of which the following is a specification.

The present invention pertains to resilient tires such as are used on the wheels of automobiles, motorcycles, or other vehicles where considerable resiliency is desired.

The object of the invention is to provide a tire of this type which will overcome many of the difficulties experienced with the expensive pneumatic tires, now in use. This tire is not dependent for its resilient quality upon air compressed and retained within a puncture-proof rubber tube, but is constructed in such manner as to present all the advantages of the former type of tire and at the same time is capable of harder, longer and more severe service.

The tire comprises an outer tread of fiber and rubber, two inner steel or metal rims, provided with slidable interlocking members engaging one another at intervals throughout the circumference of the tire, and additional rubber cushion members mounted upon metal seats and distributed around the circumference in alternate relation with said interlocking members. The parts are inclosed by sides of flexible rubber capable of expanding to allow for any compression of the inner parts.

With these and other objects, the invention consists in the construction and arrangement of parts herein more fully set forth and pointed out in the following specification and appended claims.

In order that the invention may be more clearly understood, reference is made to the accompanying drawings, in which similar parts are designated by reference letters of like character, and in which—

Figure 1 is an elevation with parts shown in section. Fig. 2 is a sectional view on the line 2—2, Fig. 1. Fig. 3 is a similar view on the line 3—3, Fig. 1. Fig. 4 is a view similar to Fig. 2 illustrating a modified form of the invention; and Figs. 5 and 6 are details of the metal spring seats.

Referring to the drawing, the wheel 1 is provided with a wooden rim 2 to which the resilient tire 3 is secured in any suitable manner, as, for instance, by bolts 4 upon which are threaded the caps 5. The interior portion of the tire is formed of two metal rims 6 and 7, each composed of two sections 6$^a$, 6$^b$, 7$^a$ and 7$^b$ respectively having their edges bent inwardly toward the center of the tire section and suitably fastened together as by means of rivets. The sheets which form the rim nearer the outer periphery of the tire are bent inwardly to form an annular recess 8 of rectangular cross section. Depending members or ears 9 are formed at regular intervals around the circumference. These are formed by integral portions of the two metal sheets constituting the outer rim 6, which are rigidly joined together and extend inwardly to a point within the center of the inner chamber of the tire. They are formed with circular openings or holes 10 having their centers coincident with a line transversely bisecting the inner chamber of the tire. The abutting portions of the sections 7$^a$ and 7$^b$ form the flange 11 diametrically opposite the recess 8, and at intervals this is provided with the integral outwardly extending members or ears 12, which extend beyond the transverse center of the inner chamber. The members 12 are spaced apart to form parallel walls, between which the depending members of the outer rim slide. To strengthen and prevent lateral movement they are coupled together by rivets 13 which pass through the holes 10 of the intermediate depending members 9. By having these holes 10 of sufficiently greater diameter than the rivets 13, slidable interlocking connections are made between the inner and outer rims of the tire, giving ample play in cases where heavy loads are to be provided for, or where the tire passes over a hard obstruction in the road. This series of interlocking connections between the two rims, situated at intervals around the circumference and at the transverse center of the tire itself, serve to strengthen and prevent any bending or twisting movement in a lateral direction.

Arranged at alternate intervals around the circumference and interspaced between the above described interlocking slidable connections, are placed a series of hollow flexible rubber cylinders 14. These cylinders are of a diameter slightly smaller than the distance between the two inner metal rims, and are supported by seats preferably in the shape of springs 15 and 16 secured to the rims 6 and 7 by rivets, with their axes parallel to the axis of the wheel. Figs. 5 and 6 show these springs in elevation and plan, respectively. Thus resilient cushions of rubber are provided at intervals throughout the tire, whose purpose and function are obvious.

Outside of the metal rims is an outer covering, a part of which consists of fabric and rubber 17 and 18 to form the tread and inner surface resting on the wheel rim respectively. These two are joined by flexible or live rubber which is vlucanized thereto and forms the sides 19 of the outer tire. By having the sides of this flexible material, provision is made for any lateral expansion due to compression of the resilient parts. This outer covering can be split and laced together along its under side, as shown at 20, thus making it possible to remove same easily for repairing, etc.

Fig. 4 illustrates a modified form in which the fabric and rubber is of circular form extending around the complete circumference of the tire and thus protects the "live" or flexible parts from wear and action of the elements.

I claim as my invention:

1. In combination, a wheel rim, a resilient tire comprising two concentric metal rims having a plurality of slidable interlocking connections at intervals around the circumference, a plurality of hollow flexible rubber cylinders disposed transversely of said tire, metal seats holding said cylinders and secured to said metal rims, said rubber cylinders being disposed alternately with said interlocking connections at intervals around the circumference.

2. A resilient tire comprising two concentric metal rims having a plurality of slidable interlocking connections, interspaced at intervals about the circumference, said connections comprising a pair of parallel members, extending inwardly from one of said rims, secured together by a rivet at a point in line with the transverse center of said tire, a member extending inwardly from the opposite metal rim, adapted to occupy a position between said parallel members and provided with a circular opening of substantially larger diameter than said rivet, adapted to encircle same, whereby second inwardly extending member may slide between said first inwardly extending member, and resilient means alternate with said interlocking connections, at intervals around the circumference.

3. A resilient tire comprising two concentric metal rims having a plurality of slidable interlocking connections at intervals about the circumference, a plurality of sheet metal seats carried by said concentric rims and having curved portions and alternate with said interlocking connections at intervals about the circumference, cylindrical rubber blocks interposed between said seats, an outer tread of rubber and fiber secured to one of said metal rims, a second ring of rubber and fiber adapted to bear upon said wheel rim, and side portions of flexible rubber vulcanized to said rings of fiber and rubber.

In testimony whereof, I affix my signature in presence of two witnesses.

DARWIN H. DONACHY.

Witnesses:
JOHN F. BURKHART,
I. BRAINE.

Copies of this patent may be obtained for five cents each, by addressing the "Commissioner of Patents, Washington, D. C."